United States Patent
Hulvey

(10) Patent No.: US 8,831,065 B2
(45) Date of Patent: *Sep. 9, 2014

(54) METHOD AND SYSTEM FOR FAST SYNCHRONIZATION AND DATA RECEPTION FOR FREQUENCY HOPPING WIRELESS COMMUNICATION SYSTEMS

(75) Inventor: Robert Hulvey, Redondo Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,059

(22) Filed: Jul. 18, 2012

(65) Prior Publication Data

US 2012/0281730 A1 Nov. 8, 2012

Related U.S. Application Data

(63) Continuation of application No. 12/048,491, filed on Mar. 14, 2008, now Pat. No. 8,249,130.

(60) Provisional application No. 60/943,217, filed on Jun. 11, 2007.

(51) Int. Cl.
*H04B 1/00* (2006.01)
*H04B 1/7156* (2011.01)

(52) U.S. Cl.
CPC .... *H04B 1/7156* (2013.01); *H04B 2001/71563* (2013.01)
USPC ........... 375/136; 375/132; 375/130; 375/316; 455/161.1; 455/39; 455/132; 370/320

(58) Field of Classification Search
CPC ..... H04B 1/713; H04B 1/7143; H04L 5/0007
USPC ......... 375/132, 130, 316, 136; 455/161.1, 39, 455/132; 370/320
See application file for complete search history.

(56) References Cited

U.S. PATENT DOCUMENTS 4,933,954 A * 6/1990 Petry .............................. 375/136
5,224,121 A 6/1993 Schorman
(Continued)

FOREIGN PATENT DOCUMENTS

| EP | 0423715 | 4/1991 |
| EP | 1383247 | 1/2004 |
| GB | 2164822 | 3/1986 |
| WO | 9635265 | 11/1996 |

OTHER PUBLICATIONS

European Search Report corresponding to European Application Serial No. 08007362.0-2411, mailed Oct. 6, 2008, 3 Pages.

*Primary Examiner* — Leila Malek
(74) *Attorney, Agent, or Firm* — McDermott Will & Emery LLP

(57) ABSTRACT

Methods and systems for fast synchronization and data reception for frequency hopping wireless communication systems are disclosed. Aspects of one method may include receiving a plurality of RF signals corresponding to a plurality of hopping frequencies. The RF signals may be processed in parallel to determine a hopping sequence. For example, the plurality of RF signals may be down-converted to a corresponding plurality of IF or baseband signals. The down-converted signals may be combined together to a single combined signal, and the single combined signal may then be processed to determine the frequency hopping sequence.

16 Claims, 8 Drawing Sheets

(56) References Cited

U.S. PATENT DOCUMENTS

| | | |
|---|---|---|
| 5,625,641 A | 4/1997 | Takakusaki |
| 5,718,234 A * | 2/1998 | Warden et al. ............... 600/300 |
| 5,870,426 A * | 2/1999 | Yokev et al. .................. 375/133 |
| 2003/0054788 A1 * | 3/2003 | Sugar et al. .................. 455/323 |
| 2003/0156634 A1 * | 8/2003 | Zurbes ........................ 375/227 |
| 2003/0197488 A1 * | 10/2003 | Hulvey ........................ 320/135 |
| 2003/0198281 A1 * | 10/2003 | Grier et al. ................... 375/133 |
| 2005/0156780 A1 | 7/2005 | Bonthron et al. |
| 2006/0013285 A1 * | 1/2006 | Kobayashi et al. ........... 375/132 |
| 2006/0140251 A1 * | 6/2006 | Brown et al. ................. 375/135 |
| 2008/0076476 A1 | 3/2008 | Rofougaran |

* cited by examiner

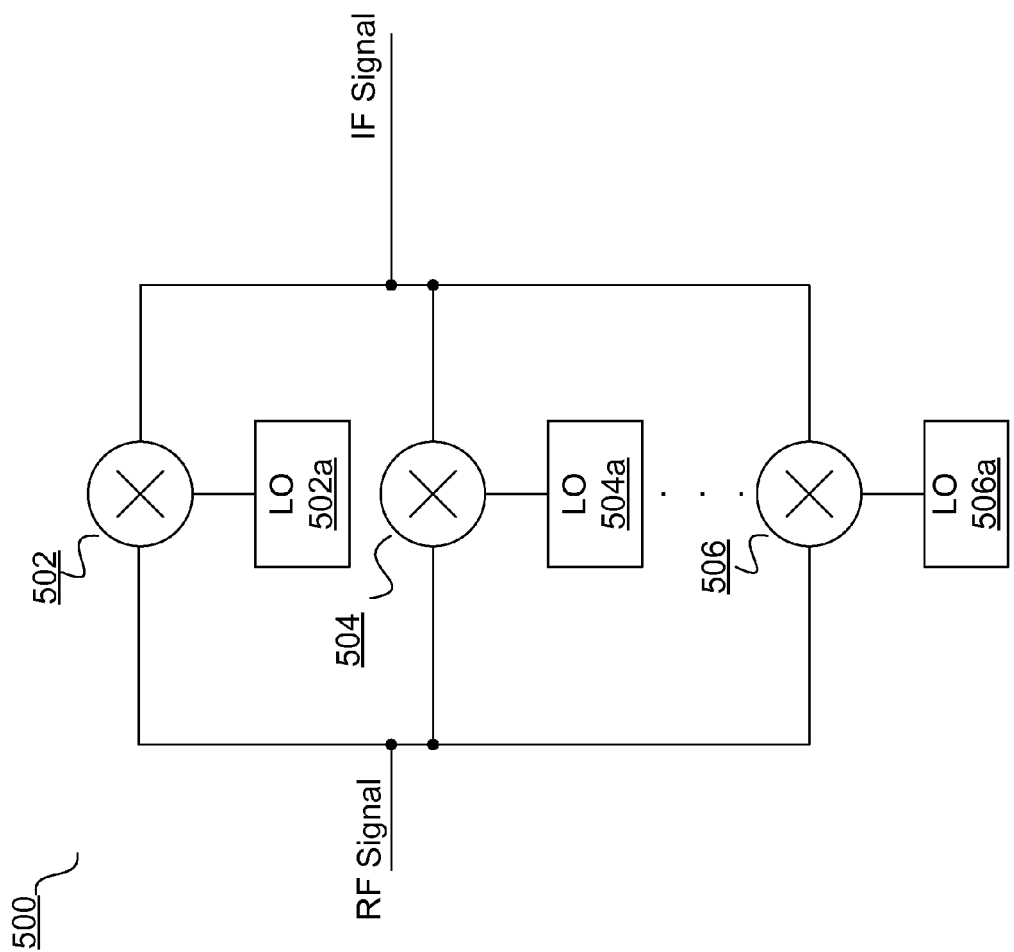

METHOD AND SYSTEM FOR FAST SYNCHRONIZATION AND DATA RECEPTION FOR FREQUENCY HOPPING WIRELESS COMMUNICATION SYSTEMS

CROSS-REFERENCE TO RELATED APPLICATIONS/INCORPORATION BY REFERENCE

This application is a continuation of U.S. application Ser. No. 12/048,491 entitled "METHOD AND SYSTEM FOR FAST SYNCHRONIZATION AND DATA RECEPTION FOR FREQUENCY HOPPING WIRELESS COMMUNICATION SYSTEMS" and filed on Mar. 14, 2008, which makes reference to, claims priority to, and claims benefit of U.S. Provisional Application Ser. No. 60/943,217 filed Jun. 11, 2007. The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for fast synchronization and data reception for frequency hopping wireless communication systems.

BACKGROUND OF THE INVENTION

Some conventional systems support wireless communication between wireless devices. Such communication systems range from national and/or international cellular telephone systems to the Internet, and to point-to-point in-home wireless networks. Each type of communication system is designed, and hence operates, in accordance with relevant communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicate via those channel(s). Each channel may utilize one or more of the plurality of radio frequency (RF) carriers of the wireless communication system. For indirect wireless communication, each wireless communication device communicates directly with an associated base station, for example, for cellular services, and/or an associated access point, for example, for an in-home or in-building wireless network, via an assigned channel or channels.

In order for each wireless communication device to participate in a wireless communication session, it may utilize a built-in radio, which comprises a receiver and/or a transmitter, and/or it may be coupled to an associated radio transceiver, for example, a station for in-home and/or in-building wireless communication networks, or a RF modem. The transmitter converts data into RF signals by modulating the data in accordance with the particular wireless communication standard. However, different communication systems may use different standards, for example, the IEEE 802.11 standard and the Bluetooth standard, which may share the same RF spectrum.

In order to alleviate signal interference from various RF devices sharing an RF spectrum with other communication systems, a transmission standard may allow frequency hopping where information is transmitted at various frequencies at different time instances. In this manner, the energy of the transmitted signal may be spread across the RF spectrum over the various channels allowed for communication. The advantage of frequency hopping may be that it spreads information across a wide band of frequencies. Therefore, signals transmitted by other systems using a portion of the same frequency spectrum may appear to be noise to only some of the frequencies used in frequency hopping. Similarly, only a portion of frequency hopping transmission may interfere with signals transmitted by other systems. Frequency hopping further provides resistance to multipath fading effects. Radio signals in some frequency bands are especially susceptible to multipath effects caused by the radio signal travelling over multiple paths with the reflections and direct signal combining either constructively or destructively at the receiver. With frequency hopping, data which is not successfully received on some frequency hops may be retransmitted on another frequency hop. In addition, with a technique called adaptive frequency hopping, the radio system can use avoid hop frequencies which are experiencing interference or multipath fading and utilize only those hop frequencies at which communications are successfully being received. A disadvantage of frequency hopping may be evident in cases where a receiving device may need to determine the frequency sequence used for frequency hopping. The receiving device may need to serially scan various channels for a sufficient period of time in order to determine the frequency hopping sequence. Since a receiver may have to acquire synchronization prior to receiving data, the longer it takes to acquire the synchronization, the period prior to which receiving of data may occur. For many applications, long periods prior to actual receiving of data may be intolerable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for fast synchronization and data reception for frequency hopping wireless communication systems, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 5A is an exemplary block diagram illustrating a plurality of mixers in a RF receiver front end, in accordance with an embodiment of the invention.

DETAILED DESCRIPTION OF THE INVENTION

Certain embodiments of the invention may be found in a method and system for fast synchronization and data reception for frequency hopping wireless communication systems. Aspects of the method may comprise receiving a plurality of RF signals corresponding to a plurality of hopping frequencies. The plurality of RF signals may be processed in parallel to determine a hopping sequence. For example, the plurality of RF signals may be down-converted to a corresponding plurality of IF or baseband signals. The down-converted signals may be combined together to generate a single combined signal. The single combined signal may then be processed to determine the frequency hopping sequence.

Another embodiment of the invention may generate in parallel a baseband signal for each of the plurality of RF signals. These baseband signals may be processed to determine which baseband signal may comprise information needed to determine the frequency hopping sequence. Another embodiment of the invention may comprise generating a wideband signal that encompasses information received via the plurality of RF signals. The wideband signal may then be processed to determine the frequency hopping sequence.

Figure 1:
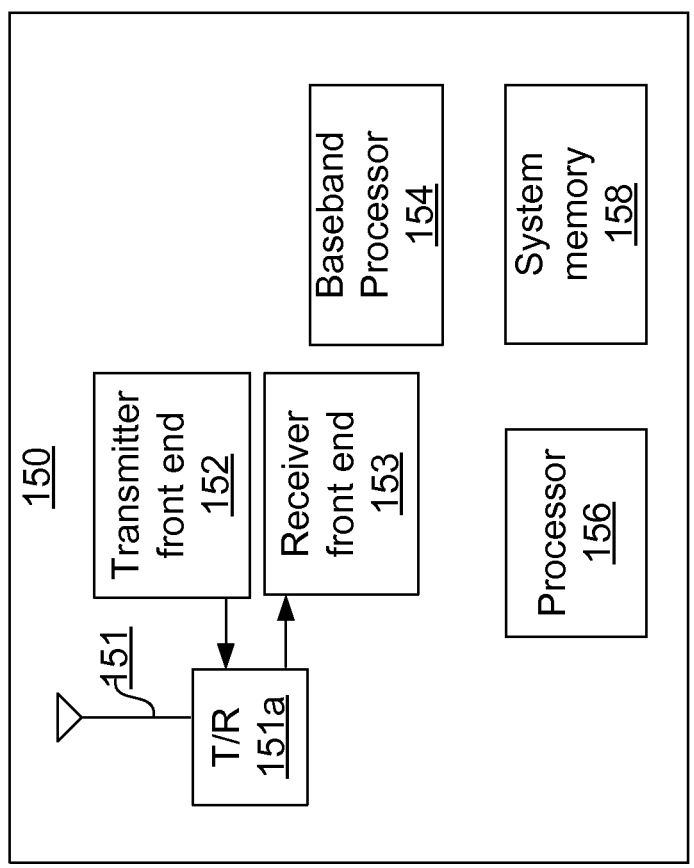
FIG. 1 is a block diagram of an exemplary wireless system, which may be utilized in connection with an embodiment of the invention.

FIG. 1 is a block diagram of an exemplary wireless system, which may be utilized in connection with an embodiment of the invention. Referring to FIG. 1, the wireless system 150 may comprise an antenna 151, a transmitter/receiver switch 151a, a transmitter front end 152, a receiver front end 153, a baseband processor 154, a processor 156, and a system memory 158. The transmitter/receiver switch 151a may comprise suitable circuitry that enables the antenna 151 to be used for both receiving and transmitting. The transmitter front end (TFE) 152 may comprise suitable logic, circuitry, and/or code that may be adapted to up-convert a baseband signal directly to an RF signal and to transmit the RF signal via a transmitting antenna 151. The TFE 152 may also be adapted to up-convert a baseband signal to an IF signal, and up-convert the IF signal to a RF signal and then transmit the RF signal via the transmitting antenna 151. The TFE 152 may be adapted to execute other functions, for example, filtering the baseband signal, and/or amplifying the baseband signal.

The receiver front end (RFE) 153 may comprise suitable logic, circuitry, and/or code that may be adapted to down-convert a RF signal directly to a baseband signal for further processing. The RFE 153 may also be adapted to down-convert a RF signal to an IF signal, and down-convert the IF signal to a baseband signal for further processing. The RFE 153 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice-versa. The processor 156 may be a suitable processor or controller such as a CPU or DSP, or any type of integrated circuit processor. The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. Furthermore, if the wireless system 150 comprises more than one processor, control and/or data information, which may include the programmable parameters, may be transferred from at least one controller and/or processor to the processor 156. Similarly, the processor 156 may be adapted to transfer control and/or data information, which may include the programmable parameters, to at least one controller and/or processor, which may be part of the wireless system 150.

The processor 156 may utilize the received control and/or data information, which may comprise the programmable parameters, to determine an operating mode of the TFE 152. For example, the processor 156 may be utilized to select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2:
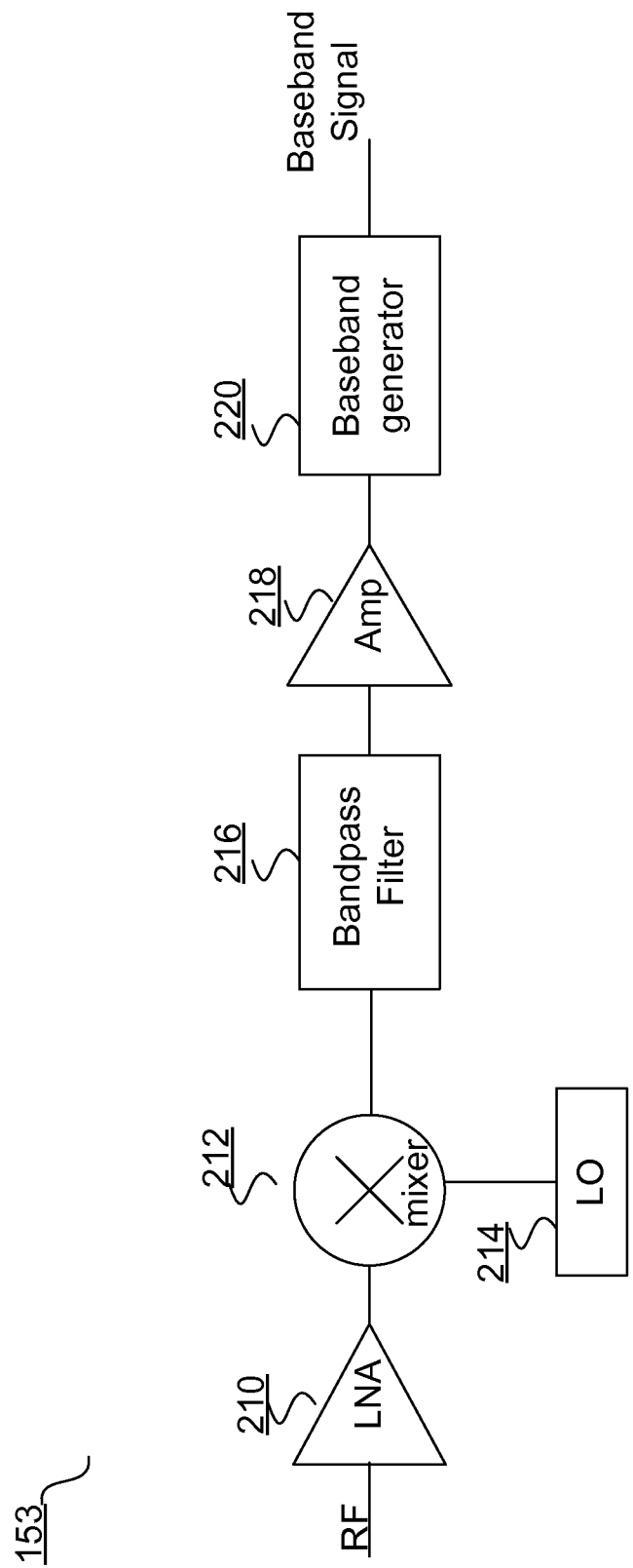
FIG. 2 is a block diagram illustrating an exemplary RF receiver front end, which may be utilized in connection with an embodiment of the invention.

FIG. 2 is a block diagram illustrating an exemplary RF receiver front end, which may be utilized in connection with an embodiment of the invention. Referring to FIG. 2, there is shown amplifiers 210 and 218, a mixer 212, an intermediate frequency local oscillator (IF LO) 214, a bandpass filter 216, and a baseband generator 220. The amplifiers 210 and 218 may comprise suitable logic, circuitry, and/or code that may be adapted to amplify input signals and output the amplified signals. The amplifier 210 and/or the amplifier 218 may be a low noise amplifier (LNA). A LNA may be utilized in instances where the signal to noise ratio (SNR) may be relatively low, such as, for example, RF signals received by an antenna. The amplifiers 210 and 218 may also be variable gain amplifiers, where the gain control may be, for example, under a programmable control of a processor/controller 156 (FIG. 1).

The mixer 212 may comprise suitable logic, circuitry, and/or code that may be adapted to receive two input signals, and generate an output signal, where the output signal may be a difference of the frequencies of the two input signals or a sum of the frequencies of the two input signals.

The IF LO 214 may comprise suitable logic, circuitry, and/or code that may be adapted to output a signal of a specific frequency, either preset or variable under external control, where the external control may be a voltage. The latter type may be referred to as a voltage controlled oscillator (VCO). A VCO control voltage may be, for example, under programmable control of a processor/controller 156 (FIG. 1).

The bandpass filter 216 may comprise suitable logic, circuitry, and/or code that may be adapted to selectively pass signals within a certain bandwidth while attenuating signals outside that bandwidth.

The baseband generator 220 may comprise suitable logic, circuitry, and/or code that may be adapted to generate analog baseband signal from the IF signal communicated by the amplifier 218. For example, analog down-conversion of the IF signal to analog baseband signal may comprise using a mixer (not shown) similar to the mixer 212. If the baseband processor 154 (FIG. 1) is a digital baseband processor, the analog baseband signal may be converted to digital signal and communicated to the baseband processor 154. An analog to digital converter (ADC) (not shown) may be utilized to digitize the analog IF signal.

Digital down-conversion may comprise digitizing the IF signal, processing the digitized IF signal, for example, filtering and down-converting, to generate a digital baseband signal, which may then be communicated to the baseband processor 154. If the baseband processor 154 (FIG. 1) is an analog baseband processor, the digital baseband signal may be converted to analog baseband signal and communicated to the baseband processor 154. A digital to analog converter (DAC) (not shown) may be utilized to convert the digital IF signal. The down-conversion of the digital IF signal to the digital baseband signal may utilize, for example, decimation filters where the input frequency of the decimation filter may be a multiple of the output frequency of the decimation filter. The digital filtering of the digital samples may utilize a derotator that may utilize a coordinate rotation digital calculation (CORDIC) algorithm.

In operation, the RF signal, which may have a carrier frequency referred to as $f_{RF}$, may be received by an antenna and communicated to the amplifier 210, where the RF signal may be amplified by the amplifier 210. The amplified RF signal may be communicated to an input of the mixer 212. The output signal of the LO 214, which may have a frequency of $f_{LO}=f_{RF}+f_{IF}$ or $f_{LO}=f_{RF}-f_{IF}$, may be communicated to another input of the mixer 212, where $f_{IF}$ may be a desired intermediate frequency. The mixer 212 may process the two input signals such that the output signal may have a desired frequency. The mixer 212 output signal may be referred to as an IF signal.

The IF signal may be communicated to a bandpass filter 216, which may be adapted to pass the desired bandwidth of signals about the IF frequency $f_{IF}$, while attenuating the undesired frequencies in the IF signal. The filtered IF signal may be amplified by the amplifier 218, and the amplified IF signal may be communicated to the baseband generator 220. The baseband signal output by the baseband generator 220 may be communicated to the baseband processor 154 for further processing. The processing may comprise, for example, filtering and/or amplifying.

Figure 3:
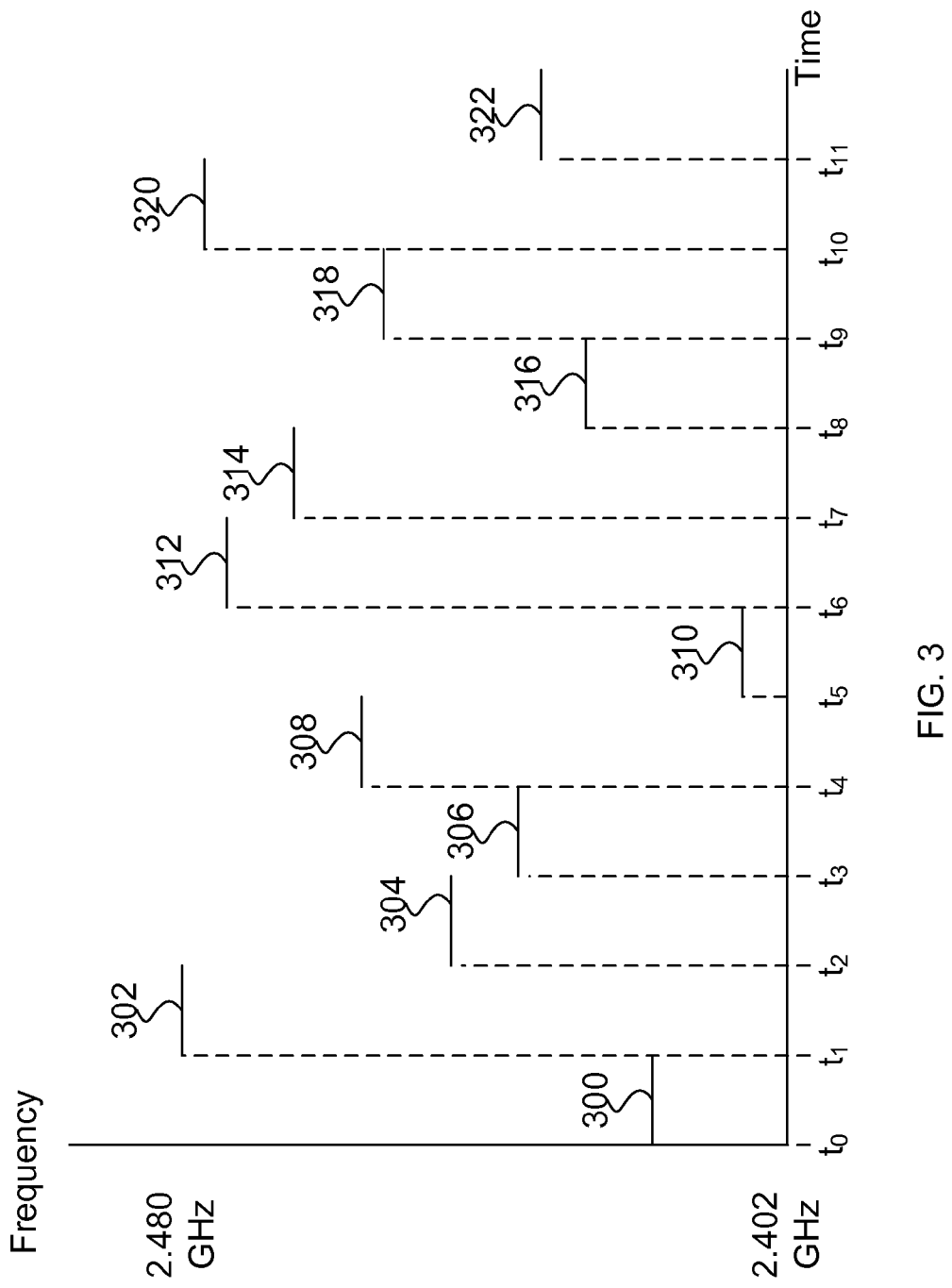
FIG. 3 is an exemplary graph illustrating frequency hopping, in connection with an embodiment of the invention.

FIG. 3 is a graph illustrating frequency hopping, in connection with an embodiment of the invention. Referring to FIG. 3, there is shown a graph with frequency on the vertical axis and time on the horizontal axis. There is also shown a range of frequencies from 2.402 gigahertz (GHz) to 2.480 GHz. There is further shown a plurality of packets 300, 302, . . . , 322, transmitted at times t0, t1, . . . , t11. The frequency range from 2.402 GHz to 2.480 GHz may be, for example, the spectrum utilized by Bluetooth communication devices.

In operation, a device, which may be, for example, a Bluetooth device, may transmit packets where each packet may be transmitted at a different frequency. This may be referred to as frequency hopping. One advantage of frequency hopping may be that the information transmitted may be spread over a wide spectrum of frequencies, and, therefore, noise at any part of the spectrum may only affect a portion of the information transmitted. The noise may be any signal in the transmit frequency range that affects the transmitted information.

As an illustration, Bluetooth devices within a piconet use a common hopping sequence that is a function of the Bluetooth clock of the master Bluetooth device in the piconet. However, if a slave Bluetooth device has not communicated with the master Bluetooth device for a period of time, or if the slave Bluetooth device is new to the piconet, the slave Bluetooth device may need to synchronize to the clock of the master Bluetooth device. The synchronization occurs when the slave Bluetooth device receives an FHS (Frequency Hopping Synchronization) packet transmitted by the master Bluetooth device.

The master Bluetooth device may have acquired the slave Bluetooth device's address during inquiry phase. The clock offset synchronization hop frequencies used to achieve a connection with a slave Bluetooth device are a function of the device address of the slave device. Accordingly, a slave device that wishes to communicate with a master device may listen to a set of paging hop frequencies that is a function of the slave's device address. Once the slave device synchronizes with the master device clock, the slave device may be able to receive packets at the various hop frequencies used by the master device.

Figure 4:
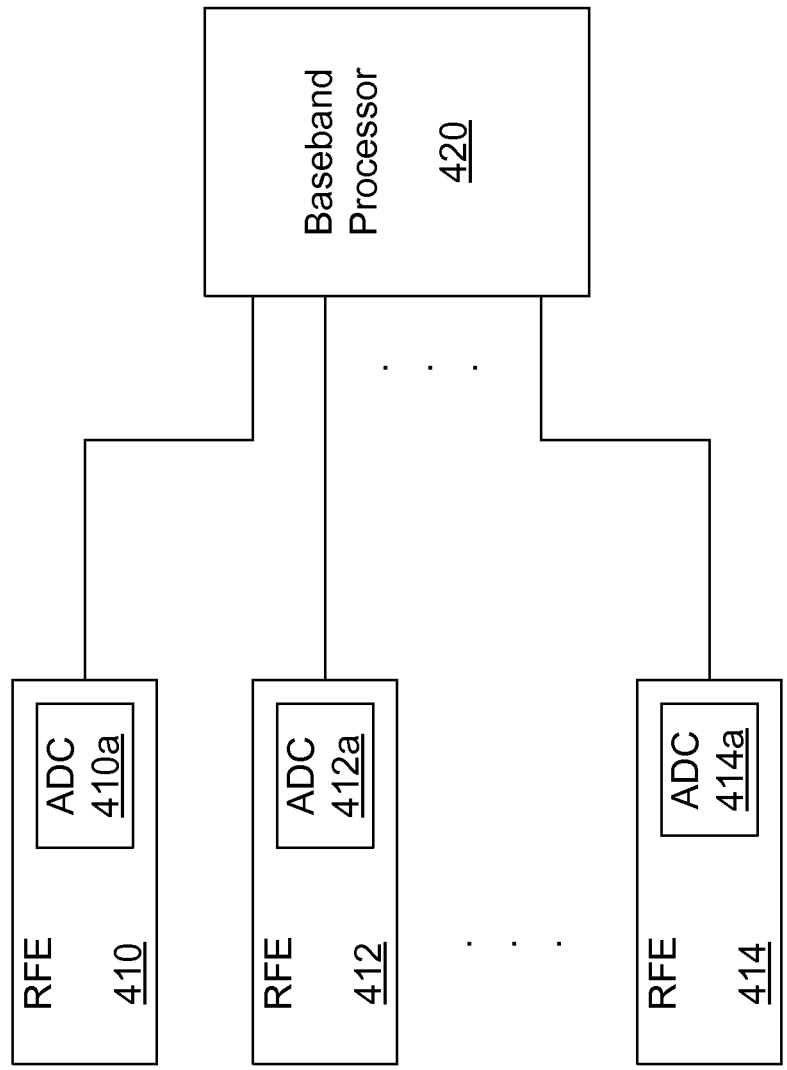
FIG. 4 is an exemplary block diagram illustrating a plurality of RF receiver front ends, in accordance with an embodiment of the invention.

FIG. 4 is an exemplary block diagram illustrating a plurality of RF receiver front ends, in accordance with an embodiment of the invention. Referring to FIG. 4, there is shown a plurality of RFEs 410, 412, . . . , 414, a plurality of ADCs 410a, 412a, . . . , 414a, and a baseband processor 420. The RFEs 410, 412, . . . , 414 may each be similar to the RFE 153, and the baseband processor 420 may be similar to the baseband processor 154.

In operation, the RFEs 410, 412, . . . 414 may be used to receive signals at specific hop frequencies. The number of hop frequencies that may be monitored may depend on the number of RFEs, which may be design dependent. Accordingly, when a receiving device needs to synchronize to the current hopping sequence, the plurality of RFEs 410, 412, . . . , 414 may be used to simultaneously receive signals at various hop frequencies. The received baseband signals may be communicated to the baseband processor 420 for further processing. A processor, such as, for example, the baseband processor 420 and/or the processor 156, may identify whether any of the baseband signals may comprise appropriate information, such as a device address, from the transmitting device.

For example, if the transmitting device is a master Bluetooth device, the baseband processor 420 and/or the processor 156 in the slave Bluetooth device may monitor baseband signals from the various paging hop frequencies. Once the slave Bluetooth device receives its device access code via a baseband signal from one of the RFEs 410, 412, . . . , 414, the slave Bluetooth device may proceed to connect with the master Bluetooth device. If the number of RFEs 410, 412, . . . , 414 is less than the number of paging hop frequencies used, for example, for Bluetooth paging, the frequencies that the RFEs 410, 412, . . . , 414 are monitoring may be changed after an appropriate time period has elapsed. For example, the appropriate time period may be a time period between successive transmissions of a slave Bluetooth device's access code. Accordingly, an amount of time needed to synchronize to the master Bluetooth clock may be reduced by using the plurality of RFEs 410, 412, . . . , 414 rather than a single RFE, where the single RFE may need to serially monitor a different frequency after each scan window period.

Additionally, a non-Bluetooth wireless standard may allow a receiving device to determine the hopping sequence based on tracking the hopping frequencies used by a presently transmitting device. The receiving device may then use the hopping sequence to receive packets and/or transmit packets by tuning the RF circuitry to appropriate frequencies. Accordingly, the plurality of RFEs 410, 412, . . . , 414 may be used to quickly determine the frequencies being used since the RFEs 410, 412, . . . , 414 may be used to monitor the various hopping frequencies that may be used by the transmitting device.

FIG. 5A is an exemplary block diagram illustrating a plurality of mixers in a RF receiver front end, in accordance with an embodiment of the invention. Referring to FIG. 5A, there is shown a RFE 500 that may comprise a plurality of mixers 502, 504, . . . , 506, and a plurality of local oscillators (LOs) 502a, 504a, . . . , 506a. The mixers 502, 504, . . . , 506 may each be similar to the mixer 212, and the LOs 502a, 504a, . . . , 506a may each be similar to the LO 214.

In operation, the mixers 502, 504, . . . , 506 may be used to down-convert received RF signals to IF signals. For example, each of the mixers 502, 504, . . . , 506 may receive a different signal from the LOs 502a, 504a, . . . , 506a, respectively, to down-convert a RF signal at a specific frequency to an IF signal. The IF signals from the mixers 502, 504, . . . , 506 may be combined to form a single IF signal, which may then be processed to a baseband signal by the RFE 500. The number of RF frequencies that may be down-converted may depend on the number of mixers 502, 504, . . . , 506, which may be design dependent.

Accordingly, if, for example, the Bluetooth communication standard is used for explanatory purposes, when a slave Bluetooth device, needs to synchronize to the master Bluetooth device, the RFE 500 may be used to simultaneously down-convert a plurality of paging hop frequency signals to a single baseband signal. The single baseband signal may then be communicated to, for example, the baseband processor 154 for further processing. A processor, such as, for example, the baseband processor 154 and/or the processor 156 may then determine whether the baseband signal may comprise appropriate information, such as, for example, an access code, from the master Bluetooth device.

The baseband processor 154 and/or the processor 156 in the slave Bluetooth device may monitor the combined baseband signal from the various paging hop frequencies. Once the slave Bluetooth device receives its access code via the baseband signal, the slave Bluetooth device may proceed to make a channel connection with the master Bluetooth device. However, this may require identifying the specific paging hop frequency that was used to transmit the device address. In order to determine which paging hop frequency was used to transmit the device address, the master Bluetooth device may need to transmit a channel number with the device address, where a specific channel number may correspond to a specific hop frequency. Alternatively, the master Bluetooth device may transmit clock information which enables the slave Bluetooth device to calculate the offset of its own clock relative to the master's clock. The slave Bluetooth device may then be able to determine the paging hop frequency used, and, therefore, be able to communicate with the master Bluetooth device.

If the number of mixers is less than the number of paging hop frequencies used, for example, for Bluetooth paging, the frequencies that the mixers are down-converting may be changed after an appropriate time period has elapsed. For example, the appropriate time period may be a time period for successive transmission of a slave Bluetooth device's access code by the Bluetooth master device. Accordingly, the time needed to synchronize to the master Bluetooth clock may be reduced by using the plurality of mixers in a RFE rather than a single mixer in a RFE, where the single mixer may be used to serially monitor a different frequency during each scan window period.

Additionally, a non-Bluetooth wireless standard may allow a receiving device to determine the hopping sequence based on tracking the hopping frequencies used by a presently transmitting device. The receiving device may then use the hopping sequence to receive packets and/or transmit packets by tuning the RF circuitry to appropriate frequencies. Accordingly, the plurality of mixers 502, 504, . . . , 506 may be used to quickly determine the frequencies being used since the mixers 502, 504, . . . , 506 may be used to monitor the various hopping frequencies that may be used by the transmitting device.

Figure 5B:
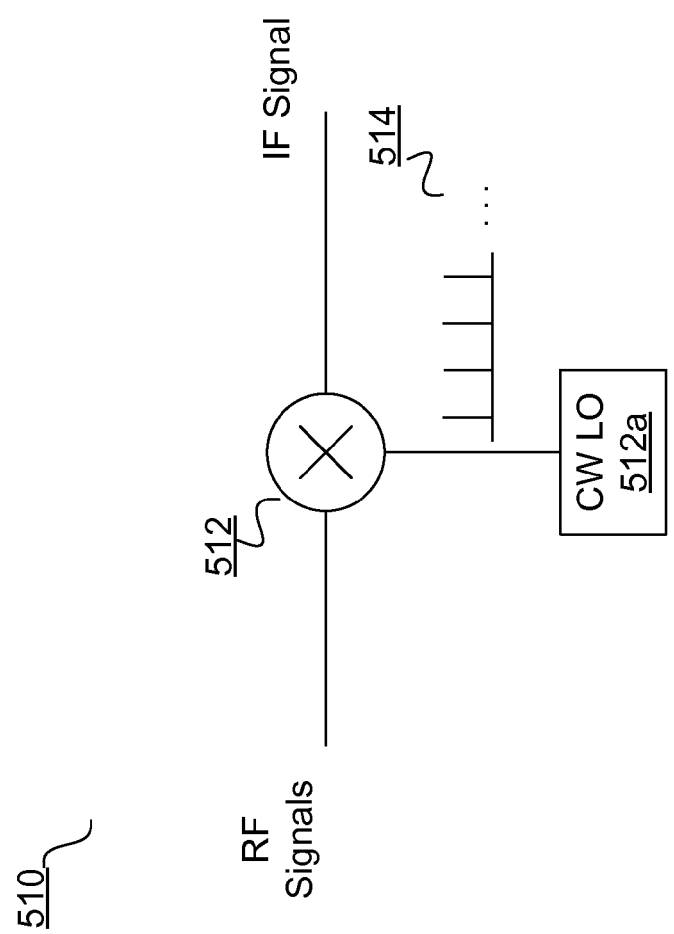
FIG. 5B is an exemplary block diagram illustrating a single mixer in a RF receiver front end, in accordance with an embodiment of the invention.

FIG. 5B is an exemplary block diagram illustrating a single mixer in a RF receiver front end, in accordance with an embodiment of the invention. Referring to FIG. 5B, there is shown a RFE 510 that may comprise a mixer 512 and a continuous wave local oscillator (CW LO) 512a. The mixer 512 may be similar to the mixer 212. The CW LO 512a may comprise circuitry and/or logic that may enable generation of several CW tones 514. Spectrally, the output of the CW LO 512a may be described as a "comb," where each tooth of the comb may be a specific frequency.

In operation, the mixer 512 may be used to down-convert received RF signals to IF signals. For example, the mixer 512 may receive a signal from the CW LO 512a to down-convert each of the received RF signals to an IF signal with a same frequency. Accordingly, the received RF signals may be down-converted and combined to form a single IF signal, which may then be processed to a baseband signal by the RFE 500. The number of RF frequencies that may be down-converted may depend on the number of continuous wave tones from the CW LO 512, which may be design dependent. Furthermore, each of the CW tones 514 in the "comb" may be selectively turned on or off. Turning each of the CW tones 514 on or off may be controlled by a processor, such as, for example, the baseband processor 154 and/or the processor 156. A CW tone that may correspond to a paging frequency where there may be significant interference may be selectively and dynamically turned off, allowing the system to adapt to noisy environments. One or more of the CW tones 514 may also be turned off if the system knows in advance that some of those frequencies used by those CW tones may also be used by another RF system operating in close proximity.

Accordingly, if, for example, the Bluetooth communication standard is used for explanatory purposes, when a slave Bluetooth device, needs to synchronize to the master Bluetooth device, the RFE 500 may be used to simultaneously down-convert a plurality of paging hop frequency signals to an IF signal or directly to a single baseband signal. The single baseband signal may then be communicated to, for example, the baseband processor 154 for further processing. A processor, such as, for example, the baseband processor 154 and/or the processor 156 may then determine whether the baseband signal may comprise appropriate information, such as, for example, an access code, from the master Bluetooth device.

The baseband processor 154 and/or the processor 156 in the slave Bluetooth device may monitor the combined baseband signal from the various paging hop frequencies. Once the slave Bluetooth device receives its access code via the baseband signal, the slave Bluetooth device may proceed to make a channel connection with the master Bluetooth device. However, this may require identifying the specific paging hop frequency that was used to transmit the device address. In order to determine which paging hop frequency was used to transmit the device address, the master Bluetooth device may need to transmit a channel number with the device address, where a specific channel number may correspond to a specific hop frequency. Alternatively, the master Bluetooth device may transmit clock information which enables the slave Bluetooth device to calculate the offset of its own clock relative to the master's clock. The slave Bluetooth device may then be able to determine the paging hop frequency used, and, therefore, be able to communicate with the master Bluetooth device.

If the number of CW tones from the CW LO 512 is less than the number of paging hop frequencies used, for example, for Bluetooth paging, the RF frequencies that are down-converted may be changed after an appropriate time period has elapsed. For example, the appropriate time period may be a time period for successive transmission of a slave Bluetooth device's access code by the Bluetooth master device. Accordingly, the time needed to synchronize to the master Bluetooth clock may be reduced by using the CW LO 512a in a RFE rather than a single LO and a single mixer in a RFE.

Additionally, a non-Bluetooth wireless standard may allow a receiving device to determine the hopping sequence based on tracking the hopping frequencies used by a presently transmitting device. The receiving device may then use the hopping sequence to receive packets and/or transmit packets by tuning the RF circuitry to appropriate frequencies. Accordingly, the CW LO 512a and the mixer 512 may be used to quickly determine the frequencies being used since the various LO frequencies from the CW LO 512a may be used to monitor the various hopping frequencies that may be used by the transmitting device.

Figure 6:
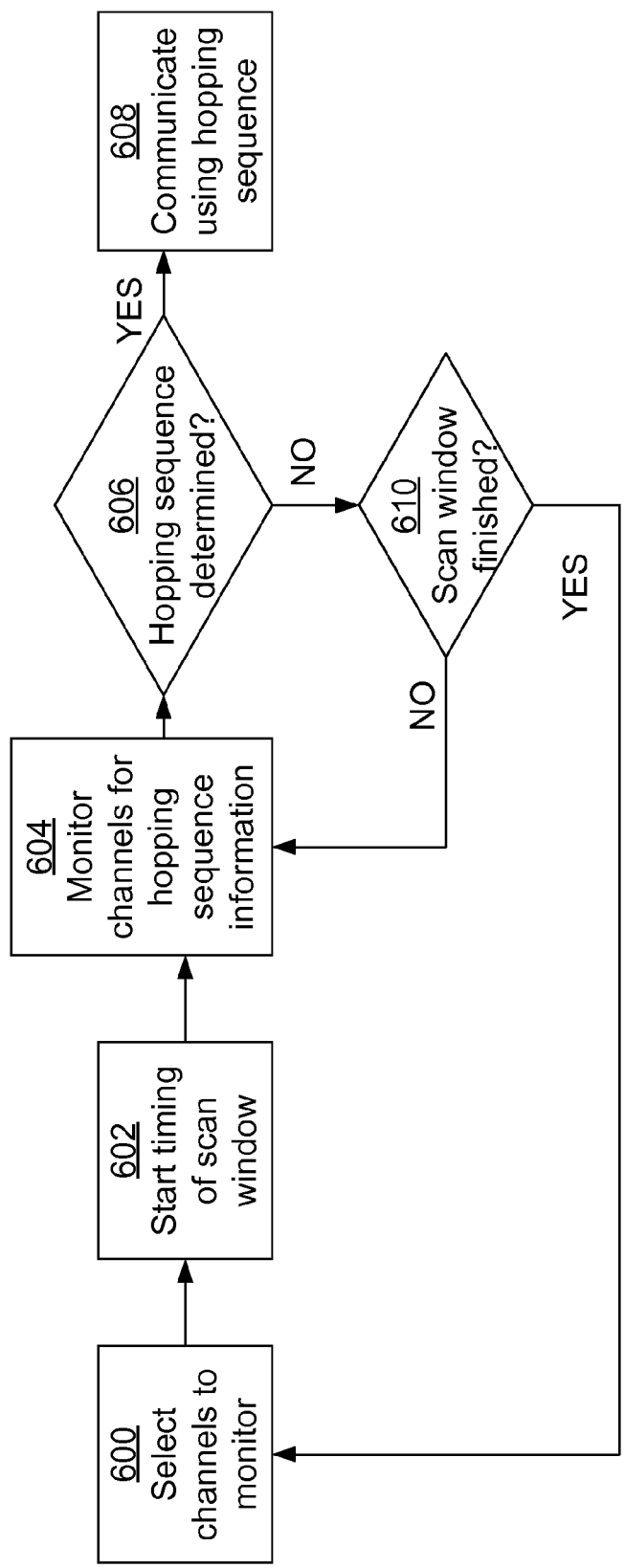
FIG. 6 is an exemplary flow diagram for utilizing a plurality of RF receiver front ends for fast synchronization and data reception, in accordance with an embodiment of the invention.

FIG. 6 is an exemplary flow diagram for utilizing a plurality of RF receiver front ends for fast synchronization and data reception, in accordance with an embodiment of the invention. Referring to FIG. 6, there is shown steps 600 to 610 for determining a hopping sequence. In step 600, the wireless system 150 may be configured so that the RFEs 410, 412, ..., 414 may each de-modulate a hopping frequency signal to a baseband signal. Each of the baseband signals may be processed by, for example, the baseband processor 154 and/or the processor 156 to determine a hopping sequence to be used for communication between/among wireless systems. In step 602, a scan window may be started. The scan window may be a period of time during which a receiving device may attempt to determine a hopping sequence.

In step 604, the RFEs 410, 412, ..., 414 may monitor a plurality of different hopping frequencies to determine a hopping sequence. For example, a wireless standard may enable determining of a hopping sequence by tracking a pre-determined number of hopping channels. Accordingly, the RFEs 410, 412, ..., 414 may be used to track the various hopping frequencies used. The wireless system 150 may then be able to determine a hopping sequence for communication with the presently transmitting device, which may be similar, for example, to the wireless system 150.

In step 606, if the wireless system 150 received enough information to be able to determine a hopping sequence, the next step is step 608. Otherwise, the next step is step 610. In step 608, the hopping sequence may be used by the wireless system 150 for communicating with the presently transmitting device. In step 610, if the scan window period is not yet over, the next step is step 604. Otherwise, the next step is step 600.

Figure 7:
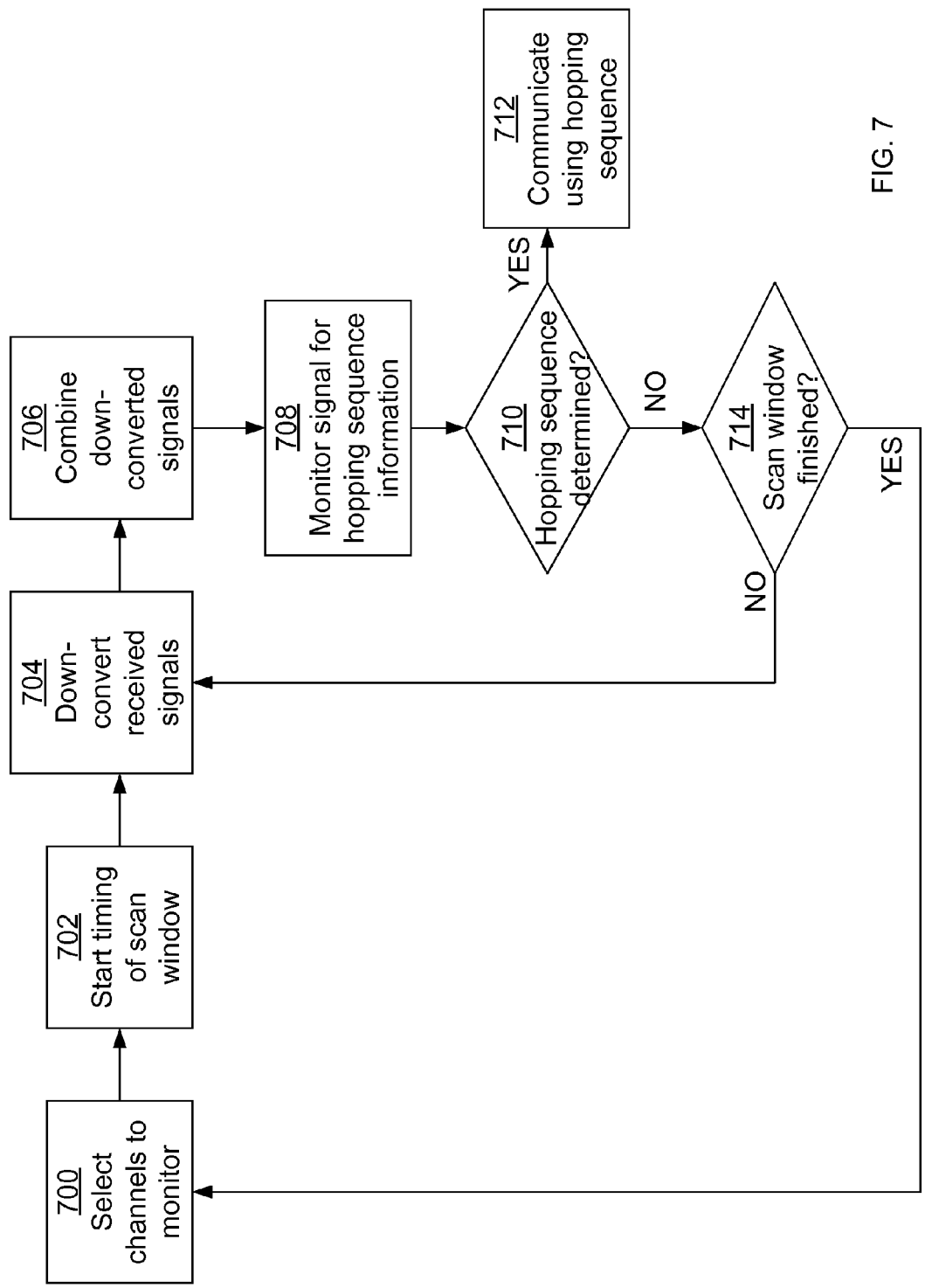
FIG. 7 is an exemplary flow diagram for utilizing a plurality of mixers in a RF receiver front end for fast synchronization and data reception, in accordance with an embodiment of the invention.

FIG. 7 is an exemplary flow diagram for utilizing a plurality of mixers in a RF receiver front end for fast synchronization and data reception, in accordance with an embodiment of the invention. Referring to FIG. 7, there is shown steps 700 to 714 for determining a hopping sequence. In step 700, the wireless system 150 may be configured so that the mixers 502, 504, ..., 506 may each de-modulate a hopping frequency signal to an IF signal. In step 702, a scan window may be started. The scan window may be a period of time during which a receiving device may attempt to determine a hopping sequence. In step 704, each of the mixers 502, 504, ..., 506 may down-convert a corresponding hopping frequency signal to an IF signal. In step 706, the IF signals from the outputs of the mixers 502, 504, ..., 506 may be combined, and then the combined IF signal may be further down-converted to a baseband signal. The baseband signal may be communicated to, for example, the baseband processor 154 for further processing.

In step 708, the baseband processor 154 and/or the processor 156 may monitor the baseband signal to determine a hopping sequence. For example, a wireless standard may enable determining of a hopping sequence by tracking a pre-determined number of hopping channels. Accordingly, the mixers 502, 504, ..., 506 may be used to track the various hopping frequencies used since one hopping frequency may be used at a time. However, the transmitting device may need to transmit a hopping channel, which may correspond to a hopping frequency, with the data transmitted. In this manner, the receiving device may be able to determine the hopping frequency used for each transmission. The wireless system 150 may then be able to determine a hopping sequence for communication with the presently transmitting device, which may be similar, for example, to the wireless system 150.

In step 710, if the wireless system 150 received enough information to be able to determine a hopping sequence, the next step is step 712. Otherwise, the next step is step 714. In step 710, the hopping sequence may be used by the wireless system 150 for communicating with the presently transmitting device. In step 714, if the scan window period is not yet over, the next step is step 704. Otherwise, the next step may is 700.

Another embodiment of the invention may comprise wideband processing of the received RF signals. For example, the RFE 153 may comprise suitable circuitry, logic, and/or code that may be enabled to down-convert the received RF signal to a wideband signal where the wideband signal may comprise the information transmitted via the various hopping frequencies. The wideband signal may then be digitally sampled, and the digital samples may be communicated to the baseband processor 154 for further processing. The baseband processor 154 and/or the processor 156 may process the digital samples to determine whether, for example, a device address may have been received. The baseband processor 154 and/or the processor 156 may be able to determine a hopping frequency that may have been used to transmit the device address, for example, by determining the frequency offset at which the information was found.

In accordance with an embodiment of the invention, aspects of an exemplary system may comprise at least one receiver front end (RFE) that enables reception of plurality of RF signals corresponding to a plurality of hopping frequencies. A processor, such as, for example, the baseband processor 154 and/or the processor 156, may be used to process the received signals for information that may be used to determine a hopping sequence. For example, when wireless devices are using the Bluetooth standard, a master Bluetooth device may transmit a slave Bluetooth device's access code. The slave Bluetooth device may determine that the transmitted access code is its own access code, and hence may be able to identify the hopping sequence used by the master Bluetooth device.

Similarly, another wireless standard may allow determination of frequency hopping sequences by identifying a certain number of the frequencies used for transmission. If a hopping frequency is only used once in a frequency hopping sequence, then transmission of data or training sequence may only need to be identified for one hopping frequency. Accordingly, the receiving device may then be able to determine the next hopping frequency to use for communicating with other wireless devices.

A plurality of RFEs 410, 412, . . . , 414 may be used to generate a baseband signal from the signals received by each of the front end circuitry. Each of the RFEs 410, 412, . . . , 414 may process in parallel the signals received via one of the plurality of hopping frequencies. The baseband signals from the plurality of RFEs 410, 412, . . . , 414 may be communicated to, for example, the baseband processor 420 for further processing. The baseband processor 420 and/or the processor 156 may process the baseband signal for the information needed to determine the frequency hopping sequence.

Another embodiment of the invention may comprise a RFE, such as, for example, the RFE 153 that may enable generation of a wideband signal comprising information received via the plurality of RF signals. The wideband signal may be processed, and a specific hopping frequency via which the information was received may be identified by calculating the frequency offset of the channel from which the information was received. A channel may be a hopping frequency.

Another embodiment of the invention may comprise a plurality of mixers 502, 504, . . . , 506 that may be used to down-convert each of the received RF signals. The down-converted signals may be IF signals or the down-converted signals may be baseband signals. The down-converted signals may be combined with each other to form a single signal. If the down-converted signal is an IF signal, the combined single signal may be further down-converted to a baseband signal. If the outputs of the mixers 502, 504, . . . , 506 are currents, then the outputs of the mixers 502, 504, . . . , 506 may be directly coupled to each other to combine the currents. The single combined signal may be communicated to the baseband processor 154 for further processing. The baseband processor 154 and/or the processor 156 may be used to extract required information from the single combined signal. However, because the single combined signal may not have the hopping frequency information, a transmitting device may need to transmit hopping frequency information along with data, such as a device address, training sequence, or other payload.

Another embodiment of the invention may comprise the CW LO 512a and a single mixer 512 for simultaneously down-converting each of a plurality of received RF signals. The CW LO 512a may generate, for example, a plurality of continuous wave tones. The CW LO 512a may also be controlled to turn off one or more CW tones, for example, if a particular RF frequency associated with a CW tone is very noisy, or if another RF device is using an RF frequency associated with that CW tone.

Another embodiment of the invention may provide a machine-readable storage, having stored thereon, a computer program having at least one code section executable by a machine, thereby causing the machine to perform the steps as described above for fast synchronization and data reception for frequency hopping wireless communication systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

Therefore, at least the following is claimed:

1. A method, comprising:
receiving, by a first wireless communication device, a plurality of radio-frequency (RF) signals in parallel using a plurality of receiver front-ends (RFEs), each of the RFEs monitoring a corresponding distinct subset of a plurality of hopping frequencies, one of the RFEs including a plurality of mixers;
processing the RF signals in parallel to determine a hopping sequence relative to the hopping frequencies, the hopping sequence being determined based at least in part on at least two hopping frequencies monitored by different ones of the RFEs, the processing further comprising monitoring in parallel each hopping frequency of the corresponding distinct subset of the hopping frequencies for the one of the RFEs using a respective mixer of the plurality of mixers; and
using the hopping sequence to receive packets transmitted by a second wireless communication device, to transmit packets to the second wireless communication device, or both.

2. The method of claim 1, wherein the processing further comprises:
- down-converting the RF signals to a corresponding plurality of down-converted signals; and
- generating a single combined signal by combining the down-converted signals.

3. The method of claim 2, wherein the down-converted signals are baseband signals.

4. The method of claim 2, wherein the down-converted signals are intermediate-frequency (IF) signals.

5. The method of claim 1, wherein the processing further comprises determining which of the hopping frequencies is in use during a particular time period.

6. The method of claim 1, wherein the processing further comprises generating a wideband signal encompassing information received via the RF signals.

7. The method of claim 1, wherein one of the RFEs includes a single mixer, and the processing further comprises serially monitoring each hopping frequency of the corresponding distinct subset of the hopping frequencies for the one of the RFEs using the single mixer.

8. A system, comprising:
- circuitry in a first wireless communication device, including a plurality of receiver front-ends (RFEs) configured to monitor a corresponding distinct subset of a plurality of hopping frequencies by receiving a plurality of radio-frequency (RF) signals, one of the RFEs including a plurality of mixers;
- the circuitry being configured to process the RF signals in parallel to determine a hopping sequence relative to the hopping frequencies, the hopping sequence being determined based at least in part on at least two hopping frequencies monitored by different ones of the RFEs;
- the circuitry being configured to monitor, in parallel, each hopping frequency of the corresponding distinct subset of the hopping frequencies using a respective mixer of the plurality of mixers; and
- the circuitry being configured to use the hopping sequence to receive packets transmitted by a second wireless communication device, to transmit packets to the second wireless communication device, or both.

9. The system of claim 8, wherein the circuitry is further configured to:
- down-convert the RF signals to a corresponding plurality of down-converted signals; and
- generate a single combined signal by combining the down-converted signals.

10. The system of claim 8, wherein the circuitry is further configured to determine the hopping sequence by determining which of the hopping frequencies is in use during a particular time period.

11. The system of claim 8, wherein the circuitry is further configured to generate a wideband signal encompassing information received via the RF signals.

12. The system of claim 8, wherein one of the RFEs includes a single mixer, and the one of the RFEs is further configured to serially monitor each hopping frequency of the corresponding distinct subset of the hopping frequencies using the single mixer.

13. A system, comprising:
- means for monitoring in parallel each of a plurality of distinct subsets of a plurality of hopping frequencies by receiving a plurality of radio-frequency (RF) signals using a plurality of receiver front-ends (RFE), one of the RFEs including a plurality of mixers;
- means for processing the RF signals in parallel to determine a hopping sequence relative to the hopping frequencies, the hopping sequence being determined based at least in part on at least two hopping frequencies in different ones of the distinct subsets, the means for processing comprising means for monitoring in parallel each hopping frequency of the corresponding distinct subset of the hopping frequencies for the one of the RFEs using a respective mixer of the plurality of mixers; and
- means for communicating packets with another communications device using the hopping sequence.

14. The system of claim 13, further comprising means for generating a wideband signal encompassing information received via the RF signals.

15. A method, comprising:
- receiving, by a first wireless communication device, a plurality of radio-frequency (RF) signals in parallel using a plurality of receiver front-ends (RFEs), each of the RFEs monitoring a corresponding distinct subset of a plurality of hopping frequencies;
- processing the RF signals in parallel to determine a hopping sequence relative to the hopping frequencies, the hopping sequence being determined based at least in part on at least two hopping frequencies monitored by different ones of the RFEs, the processing further comprising generating a down-converted signal for each of the RF signals using a single mixer that uses a plurality of continuous wave signals from a continuous wave local oscillator; and
- using the hopping sequence to receive packets transmitted by a second wireless communication device, to transmit packets to the second wireless communication device, or both.

16. A system, comprising:
- circuitry in a first wireless communication device, including a plurality of receiver front-ends (RFEs) configured to monitor a corresponding distinct subset of a plurality of hopping frequencies by receiving a plurality of radio-frequency (RF) signals;
- the circuitry being configured to process the RF signals in parallel to determine a hopping sequence relative to the hopping frequencies, the hopping sequence being determined based at least in part on at least two hopping frequencies monitored by different ones of the RFEs;
- the circuitry being configured to generate a down-converted signal for each of the RF signals using a single mixer configured to use a plurality of continuous wave signals from a continuous wave local oscillator; and
- the circuitry being configured to use the hopping sequence to receive packets transmitted by a second wireless communication device, to transmit packets to the second wireless communication device, or both.

* * * * *